United States Patent Office 3,341,341
Patented Sept. 12, 1967

3,341,341
LIGHTWEIGHT AGGREGATE
Bolton L. Corson, Chestnut Hill, and Julius Henry Pfau, Blue Bell, Pa., assignors to G. & W. H. Corson, Incorporated, Plymouth Meeting, Pa., a corporation of Delaware
No Drawing. Filed Mar. 4, 1965, Ser. No. 437,310
9 Claims. (Cl. 106—98)

ABSTRACT OF THE DISCLOSURE

A lightweight aggregate for use in concrete, comprising discrete, finely divided siliceous particles, comprising the highly siliceous, glassy spherical component of fly ash, bonded together at their points of contact to form a substantially non-spherical solid body having interconnected pores capable of readily absorbing water.

The present invention relates to an improved lightweight aggregate and to a method of making same; and, more particularly, to a lightweight aggregate particularly useful in the production of improved concrete structures and to the preparation of such aggregate.

It has been the practice to include lightweight aggregates in concrete units, floor slabs and the like, where minimum weight is important. Such lightweight aggregates are usually made from pumice, lava, slag, burned clay, or shale and cinders from combustion of coal or coke. The preparation of lightweight aggregate from these materials has involved for the most part, the application of heat to convert them into the plastic or fluid state, and causing the plastic or fluid material to expand by virtue of the evolution of gas. The gas so generated forms pores or cells which generally are non-interconnected.

Lightweight aggregate has also been manufactured from fly ash. The process used in making fly ash lightweight aggregate generally has involved subjecting fly ash to the action of a continuous nodulizing device, such as a rotary pan mixer, and introducing water by means of a spray into the mixer to form and bond the fly ash into fragile spherical nodules. The nodules are then sintered to obtain the lightweight aggregate product. For the most part, sintering has been carried out in a reducing atmosphere whereby the iron content of the fly ash is, to a considerable extent, reduced to the ferrous state thereby lowering the fusing point of the fly ash particles. The heat in the sintering zone brings the pellets quickly to red heat rendering the outer skin surface hard so that it acts as a seal to prevent the escape of gases from inside of the pellets. As the heat penetrates the pellets, the particles of the combustible or gas-forming material present produce fine gas bubbles, voids or pores which expand when the pellets become viscous. These voids or pores are generally non-interconnected, and, for the most part, do not open on the exterior surface of the pellets because of the sealing surface skin. Even where the spherical nodules are sintered under oxidizing conditions, only a relatively small percentage of the pores are interconnecting. This is due to the fact that the unsintered fragile spherical nodules are built up in relatively compact concentric layers, which layers interfere with the formation of interconnecting pores.

Thus, although such aggregates are porous, because the pores, for the most part are not interconnected, water absorbed in the pores is not available for hydration of the cement of the concrete mix in which they are included and is, therefore, not included in determining the water content of the mix.

Curing of a concrete is necessary to insure proper hydration. Ordinarily curing is effected by keeping the surface of the concrete moist for a period of several days. Unfortunately, where the concrete unit is of substantial thickness, application of water to the surface does not materially aid in obtaining a proper cure of the internal cement located a substantial distance from the moistened surface. Since the water in the pores of prior known lightweight aggregates is essentially not available for hydration of the cement, the inclusion of such lightweight aggregate in a concrete mix does not aid in proper curing of the concrete.

A principal object of this invention is to provide a novel lightweight aggregate and a method for preparing same.

Another object of the invention is to provide an improved lightweight aggregate from relatively inexpensive materials including fly ash.

Still another object of this invention is to provide a novel porous lightweight aggregate in which water absorbed in the pores is readily available to aid in obtaining a proper cure of a concrete in which it is included.

A further object is to provide an improved lightweight aggregate which is lighter in weight and which provides concrete in which it is included with greater strength.

Yet another object of this invention is the provision of a novel method of making an improved lightweight aggregate from fly ash and mixtures thereof with other siliceous materials.

A further object of this invention is to provide a concrete of improved properties containing the novel lightweight aggregate of this invention.

These and other objects of this invention will become apparent from a consideration of the following specification and the appended claims.

According to this invention there is provided a lightweight aggregate comprising discrete, finely divided siliceous particles bonded together at their points of contact by interfacial vitrification to form a substantially nonspherical solid body having interconnected pores, at least about 80 percent, by weight, of said particles comprising the highly siliceous, glassy spherical component of fly ash, said body being capable of absorbing from about 15 to about 30 percent, by weight, of water on a dry basis, in 5 minutes, and only minor amounts of water subsequent thereto, whereby the ratio of water absorbed in an additional 5 hours to the water absorbed in 5 minutes does not exceed about 0.03.

According to this invention there is also provided a novel method of making such improved lightweight aggregate which comprises preparing a moldable mixture comprising finely divided siliceous particles containing fuel needed for combustion during sintering and from about 10 to about 25 percent of water, based on total weight of said mixture, at least about 80 percent, by weight, of said siliceous particles comprising the highly siliceous glassy spherical component of fly ash, the amount of fuel present in the mixture, in terms of its carbon content, being related to the iron content of the fly ash component as more fully described hereinafter, molding said mixture into substantially non-spherical shaped bodies having the dimensions set forth hereinabove under a low pressure sufficient for said bodies to be homogeneous coherent and form-maintaining and having substantially the same water content as the mixture from which they are produced and sintering said shaped bodies at a temperature between about 1800° and 2200° F. by combustion of said fuel in the presence of an amount of combustion-sustaining gas which substantially prevents reduction of iron present in said particles to the ferrous state to bond said siliceous particles together at their points of contact by interfacial vitrification without inducing any substantial molten phase.

As stated previously, for the most part, the preparation of lightweight aggregates heretofore has involved basically, the application of heat to siliceous materials, such as clay, shale, fly ash, etc., to convert them to the plastic or fluid state, and causing the plastic or fluid material to expand by virtue of the evolution of gas. The gas so generated forms pores or cells which generally are non-interconnected. This is the case even where fly ash spherical nodules are heated under oxidizing conditions due to the formation of compacted concentric layers produced in forming the fragile green bodies. Thus, most of the water entrapped in the pores of these aggregates is not available for hydration of cement. Furthermore, soaking of such aggregate in water does not result in a substantial take-up of water which would subsequently be available to hydrate the cement. Thus, such aggregate contributes little or nothing to the cure of the cement and, in fact, may to some degree, interfere with curing by slow absorption of water over a period of hours. Soaking such aggregate to increase the water content prior to use would, at most, tend to reduce water take-up from the concrete mix during curing. Such soaking would require many hours and, in most instances, would not be in keeping with efficient concrete pouring operations.

It was discovered that unlike the prior known lightweight aggregate, the aggregate of this invention, by reason of its connected pores, rapidly absorbs water like a sponge so that within a matter of minutes after contact with water it will be found to have absorbed in excess of about 15 percent and generally from about 15 percent to about 30 percent of its weight of water. After this initial high rate of absorption it will absorb relatively little additional water even though left in contact with water for a period of many hours. More important, however, is the fact that the novel lightweight aggregate of this invention when included in a concrete mix will make available to the cement water for hydration previously absorbed by the aggregate. This can be vividly demonstrated by soaking the aggregate in water containing a dye for five minutes or less and then inserting the aggregate into a wet neat cement. Examination of the test piece after several hours shows a large halo of dye surrounding and extending outwardly from the aggregate particle, showing that water has been drawn from the aggregate by the cement and thus is available as water for hydration to effect a proper cure of the cement.

Thus, the novel aggregate of this invention, when used in a concrete mix, assists in the internal cure of the concrete, something not heretofore possible with prior known lightweight aggregates. By providing for internal cure, concrete mixes containing the lightweight aggreate of this invention have higher strength than similar mixes containing prior known aggregates.

The ability of the lightweight aggregate of this invention to rapidly absorb water in such substantial amounts as to make water available for hydration when used in a concrete mix is due to the novel structure of the aggregate. More particularly, the novel aggregate has a porous structure wherein the pores are interconnected at many points, as in a sponge. This type of porous structure is obtained by bonding together finely divided, discrete particles of siliceous material. Such bonding, however, takes place only at the points of contact between the siliceous particles, i.e., the particles are bonded together by interfacial vitrification. This novel structure is obtained by means of the process of this invention, described more fully hereinafter.

Another particular advantage of the novel aggregate of this invention is that it has a considerably lower apparent density (weight per unit volume generally expressed as pounds per cubic foot) than fly ash aggregate heretofore produced. Thus, the apparent density of the aggregate of this invention may run as low as 30 lbs./ft.$^3$, and generally will be within the range of from about 30 to about 50 lbs./ft.$^3$, as compared to that of prior known fly ash aggregates which usually exceeds 55 lbs./ft.$^3$. Concrete containing the aggregate of this invention, therefore, in addition to being stronger, also is lighter in weight. This is extremely desirable where the concrete is to be used in floor slabs, etc., where minimum weight is important.

The novel lightweight aggregate of this invention is particularly useful for inclusion in structural building units, such as bricks and blocks, where light weight and great strength are desired.

An essential component of the lightweight aggregate of this invention is the highly siliceous, glassy spherical component of fly ash. Fly ash is the finely divided ash material resulting from the combustion of powdered coal. It is carried from the furnace by stack gases and usually is collected as it leaves the furnace in electrostatic or other type collectors. As it comes from the collecting equipment, it is a gray powdery substance of such fineness that 100% passes through a 16 mesh screen, in excess of 95% passes through a 100 mesh screen, and on the order of 75% or more passes through a 325 mesh screen.

Microscopic examination of fly ash reveals that the primary ingredient is a finely divided, highly siliceous, glassy spherical component. Residual quantities of unburned carbon are usually found in fly ash together with inclusions of unfused ash. The highly siliceous component comprises spheres of a highly siliceous glass having the particle size range specified hereinabove. Separation of this siliceous component into two distinct fractions can be readily effected by the method disclosed in United States Letters Patent No. 2,975,897, issued Mar. 21, 1961.

One fraction is a magnetic fraction which is made up essentially of extremely fine crystalloids of magnetite imbedded in a siliceous glass of high specific gravity. In addition to the magnetite, iron is present in this glass in several forms including dissolved iron oxides, together with other amorphous or crystalloidal iron compounds. The individual particles are predominantly black solid glassy spheres. This fraction, which has a specific gravity of about 3.8 to 4.8 depending upon the concentration of iron oxide, comprises the subject matter of United States Letters Patent No. 2,987,406, issued June 6, 1961.

The other fraction is essentially non-magnetic and is largely composed of finely divided glassy particles of silica and alumina, nearly all of which are below 200 mesh in particle size, and are essentially free of crystalline magnetite. The specific gravity of this fraction ordinarily is in the range between about 2.1 and 2.6. This fraction comprises the subject matter of United States Letters Patent No. 2,987,408, issued June 6, 1961.

As stated above, at least about 80 percent by weight of the finely divided siliceous particles forming the novel lightweight aggregate of this invention comprise "the highly siliceous, glassy spherical component of fly ash." By this expression is meant that portion of fly ash comprising a mixture of the above-described fractions as present in raw fly ash, the substantially non-magnetic fraction alone, or synthetic mixtures of the two fractions in various proportions. Where a mixture of the two fractions is used, whether in the form of raw fly ash or in some synthetic combination, preferably the spherical component has the chemical analysis set forth in Table I, below:

TABLE I

| Component: | [1] Weight percent |
|---|---|
| $Fe_2O_3$ | 5–35 |
| $SiO_2$ | 31–63 |
| $Al_2O_3$ | 10–40 |
| CaO | 0–12 |
| MgO | 9–6 |

[1] A.S.T.M. designation: C114–61T.

Particularly preferred is a spherical component of fly ash containing from about 10 to 25 $Fe_2O_3$.

In addition to particles comprising the highly siliceous, glassy spherical component of fly ash, the lightweight aggregate of this invention may contain up to about 20 percent by weight of other finely divided particles of siliceous material, such as clays, shales, pulverized cinders or slag, etc. Preferably the additional siliceous material is a plastic clay having a Plasticity Index of at least 20, as determined by A.S.T.M. designations: D423–61T and D424–59. Where such additional siliceous material is used in combination with the siliceous fly ash component, the chemical analysis of the mixture of particles preferably falls within the range of values set forth in Table I, above.

The siliceous particles, whether the fly ash component or additive particles, preferably have a particle size such that when wet sieved according to A.S.T.M. designations: C379–56T, Section 10, and C110–58, a maximum of 2 percent, by weight, has a particle size greater than 30 mesh and a maximum of 30 percent greater than 200 mesh.

In preparing the novel lightweight aggregate product, the siliceous particles are sintered by means of combustion of a particulate fuel, such as carbon, powdered coal, etc., mixed with the siliceous particles. The amount of fuel present, expressed in terms of carbon content, ordinarily will be in the range between about 2 and about 11 percent, by weight, based on the total dry mixture. It was found that proper sintering with avoidance of any substantially molten phase to obtain particle bonding by interfacial vitrification can be attained by relating the amount of fuel present to the iron content of the siliceous particles. More particularly, since iron in a reduced state is usually present in the particles and in this form acts as flux to the lower fusion point of the siliceous particles, lesser amounts of solid fuel are needed to obtain the desired interfacial bonding and the avoidance of any substantially molten phase where the siliceous particles have a substantial iron content. This relationship between the amount of solid fuel required, expressed in terms of carbon content, and iron content is set forth in Table II, below:

TABLE II

| Fuel Carbon, Wt. Percent | Iron wt. percent, expressed as $Fe_2O_3$ |
| --- | --- |
| 2–4 | 20–30 |
| 4–7 | 10–20 |
| 7–11 | 5–10 |

Where raw fly ash is used as a starting material in preparation of the product, in most instances it will contain fuel or carbon for sintering. The amount of carbon present should be adjusted, as necessary, so as to fall within the range set forth in Table II, above. The particles of solid fuel should have a particle size less than about 30 mesh, and preferably have the same size as the siliceous particles.

According to the method of this invention, a moldable mix is prepared by mixing water with the finely divided siliceous particles. The amount of water added should provide the mixture with a workable consistency, making the mixture capable of being molded into coherent form by the method hereinafter described. The amount of water will vary with the particle size and surface area of the fly ash component, and the amount of additional siliceous material, if any, present. In most instances the water content of the plastic mixture will be between about 10 and about 25 percent, depending on the above recited factors.

If desired, a plasticizer may be added to the mix to increase its plasticity. Typical plasticizers include lignosulfonic acid compounds, such as free lignosulfonic acid or any one of its water-soluble salts. Such plasticizer may be used in amounts up to about 1 percent by weight of the mix.

After the moldable mixture is formed, it is shaped by any suitable equipment, for example an extrusion machine, a briquetting machine, etc., into substantially nonspherical bodies. The bodies may be of any suitable cross section, as for example, circular, rectangular, square, etc. The bodies should have an average transverse dimension of from about 1/8" to 3/4" and a length of from about 1/4" to about 1 1/2". Preferably, the longitudinal dimension of the body exceeds its transverse dimension, and the body is angular, i.e., has relatively sharp edges and corners.

These green bodies may be formed by molding under low pressure, the pressure being sufficient to produce homogeneous, coherent, form-maintaining bodies, but not so great as to remove any substantial quantity of water from the mix, so that the green bodies have substantially the same water content as the mix from which they are formed.

In extruding the mix, the average transverse dimension of the orifices in the extrusion plate should be from about 1/8" to about 3/4". The orifices should have side walls which do not form an angle greater than plus or minus about 20° with the orifice axis. Preferably, the walls of the orifice are substantially parallel to the axis of the orifice, although they may taper slightly inwardly or outwardly as noted above.

In addition, preferably, the length of the orifice to the average transverse dimension thereof is in the range between about 1:1 and 15:1, a ratio of 1:1 to 3:1 being particularly preferred.

In extrusion of the green bodies, the pressure of extrusion may be that produced by extruding one ton of mix per hour using from about 0.5 to 5 H.P. These values for horsepower relate solely to the power necessary for extrusion, and do not include any additional power required to operate the extrusion equipment, etc.

Particularly useful extrusion apparatus is disclosed in the copending application of Bolton L. Corson, Ser. No. 322,403, filed Nov. 8, 1963.

The green bodies of the above specified dimensions may also be molded in well known briquetting equipment, such as a rotary briquetting machine. With such equipment, the green bodies should be as stated above, coherent and form-maintaining. Suitable briquetting pressures ordinarily fall within the range of about 10 to about 75 p.s.i.

The resulting green bodies are then sintered by combustion of their fuel to form the lightweight aggregate product of this invention. The green bodies may be placed in any suitable sintering apparatus in the form of a built up, quiescent bed of the desired depth. The fuel in the bottom layer of the green bodies is then ignited and the heat therefrom ignites the fuel in superimposed layers so that there is created a combustion band which progressively ascends through the bed of material. By limiting the amount of fuel present and proportioning it to the iron content of the siliceous particles, sintering temperatures in the range between about 1800° and 2200° F. are easily reached and maintained and there is no substantially molten phase. Rather, the siliceous particles in the bodies become bonded together at their points of contact by interfacial vitrification. In addition, a sufficient amount of a combustion-supporting gas, e.g. air or oxygen, is used to prevent reduction of iron present in the siliceous particles to the ferrous state. This limits the fluxing action of the iron to maintain a relatively high fusion temperature.

A particularly advantageous apparatus and method for carrying out the sintering operation is disclosed and claimed in the above-identified copending application of Bolton L. Corson.

The product obtained according to this invention comprises a solid body of substantially the same dimensions and shape as the green body from which it is formed. The body has a microporous structure in which the pores are interconnected. These pores comprise the voids between the finely divided discrete siliceous particles which are bonded together at their points of contact by interfacial vitrification. By reason of these interconnected pores, the novel aggregate of this invention readily absorbs a substantial amount of water, which water is then available to the cement of a concrete mix in which the aggregate is used to provide for internal cure of the cement.

More specifically, the novel lightweight aggregate bodies or pellets of this invention absorb from about 15 to about 30 percent by weight (dry basis) after being in contact with water for only about 5 minutes. After this initial high absorption, they absorb very little extra water even though exposed to water for many hours, and the ratio of water absorbed in an additional 5 hours to the water absorbed in 5 minutes does not exceed about 0.03. By reason of the initial high rate of water absorption, the pellets can be readily soaked with water and then included in a concrete mix. Because after the high initial absorption the pellets show little tendency to absorb further amounts of water, the pellets do not absorb water from the concrete, but rather make water available to obtain proper curing of the concrete.

The absorption characteristics of the lightweight aggregate of this invention are determined by the following method which closely parallels A.S.T.M. designation: C20–46, where applicable.

The method of determining water absorption is as follows:

(1) PREPARATION OF SAMPLE (a) The sample should consist of a substantial number of representative aggregate pellets (b) Each pellet should be freed of all loosely adhering particles.

(c) Visibly defective specimens should not be used.

(2) DRY WEIGHT D (a) The test specimens (pellets) should be dried to constant weight by heating to 220° to 230° F. (105° to 110° C.) and the dry weight D, in grams, should be determined to the nearest 0.1 g.

(b) The drying procedure may be omitted only when the test specimens are known to be dry, as may be the case with samples taken directly from the sintering operation.

(3) SATURATION

The dry speciments (pellets) should be suspended in water for 5 minutes or 5 hours, as the case may be, during which period they should be kept entirely covered with water at room temperature.

(4) SATURATED WEIGHT W

Each saturated specimen (pellet) should be blotted lightly with a moistened smooth linen or cotton cloth to remove all drops of water from the surface, and the saturated weight W determined in grams by weighing in air to the nearest 0.1 g. The blotting operation should be performed by rolling each specimen lightly on the wet cloth which has previously been saturated with water and then pressed only enough to remove such water as will drip from the cloth. Excessive blotting will introduce error by withdrawing water from the pores of the specimen.

(5) THE WATER ABSORPTION A

The water absorption A expresses as a percentage the relationship of the weight of water absorbed to the weight of the dry specimen and should be calculated as follows:

$$A = \frac{W-D}{D} \times 100$$

(6) ABSORPTION RATIO R $$R = \frac{A \text{ in 5 hours} - A \text{ in 5 minutes}}{A \text{ in 5 minutes}}$$

The following specific examples are given for the purpose of illustration and are not intended to limit the scope of this invention.

*Example I*

A plastic mix was prepared containing 17.1% water and 82.9% of a fly ash having the following chemical analysis:

| Constituent | Weight Percent | Weight Percent (Carbon Free) |
|---|---|---|
| Carbon | 4.1 | |
| Fe₂O₃ | 19.5 | 20.3 |
| SiO₂ | 39.6 | 41.2 |
| Al₂O₃ | 23.9 | 24.9 |
| CaO | 6.3 | 6.6 |
| MgO | 1.2 | 1.3 |

The fly ash had the following screen analysis:

97.3% through 120 mesh sieve
95.1% through 140 mesh sieve
92.7% through 200 mesh sieve
80.5% through 325 mesh sieve
(Specific gravity 2.6)

This plastic mix was extruded to form green bodies of from 10/32″ to 13/32″ in diameter and approximately 3/8″ in length. These green bodies were sintered at 2200° F. in the apparatus of the aforementioned copending application of Bolton L. Corson. The sintering time for each pellet was about 2.5 minutes.

The sintered pellets were tested for water absorption characteristics following the procedure outlined above. The results are set forth in Table III, below.

TABLE III

| Time | Dry Weight, D | Wet Weight, W | Absorption A, Percent |
|---|---|---|---|
| 5 minutes | ¹ 102.1 | 126.0 | 23.4 |
| 5 hours | ¹ 102.1 | 126.6 | 24.0 |

¹ Same sample.

From the data set forth in Table III it can be seen that the product of the invention rapidly absorbs a substantial amount of water, but after this initial absorption absorbs only 0.6% additional in 5 hours.

Portions of the lightweight aggregate so prepared were used in the preparation of a concrete mix as set forth in Table IV, below.

TABLE IV

Constituent:              Amt. (nominal cu. yd. bases)
    Portland cement (lbs.) _____ 564
    Lightweight aggregate (lbs) _____ 920
    Sand (lbs.) _____ 1200
    Water (total gals.) _____ 56

The concrete making properties of this mix design are set forth in Table V, below.

TABLE V

Slump (in.) ¹ _____ 4.
Percent air ² _____ 5.8.
Wet weight (lbs./ft.³) _____ 115.4.
Mixing time (min.) _____ 4.
Workability _____ Excellent.
Compressive strength (p.s.i.): ³
    7 days _____ 3325.
    28 days _____ 4402.

¹ A.S.T.M. designation: C143–58.
² A.S.T.M. designation: C173–58.
³ A.S.T.M. designation: C39–64.

*Example II*

A plastic mix was prepared containing 14.3% water and 86.7% of fly ash having the following chemical analysis.

| Constituent: | Wt. percent |
|---|---|
| Carbon | 5.44 |
| $Fe_2O_3$ | 16.63 |
| $SiO_2$ | 43.42 |
| $Al_2O_3$ | 27.50 |
| CaO | 4.74 |
| MgO | 1.10 |

98% passed through a No. 30 sieve.

This plastic mix was extruded to form green bodies having an average diameter of 3/8" and an average length of 1/2". These green bodies were sintered at 2100° F. in an oxidizing atmosphere in the sintering apparatus described and illustrated in the aforementioned copending application of Bolton L. Corson.

The sintered pellets were tested for water absorption characteristics following the procedure outlined above and the results are set forth in Table V, below.

TABLE V

| Time | Absorption A | Absorption Ratio |
|---|---|---|
| 5 minutes | 23.45 | |
| 5 hours | 24.00 | 0.0224 |

The pellets had an apparent density of 46 lbs./ft.³

*Example III*

A fly ash having the following composition was formed into spherical nodules 3/8" in diameter (ave.) using a rotating pan nodulizer equipped with a water spray.

| Constituent: | Wt. percent |
|---|---|
| Carbon | 5.95 |
| $Fe_2O_3$ | 19.48 |
| $Al_2O_3$ | 39.6 |
| $SiO_2$ | 23.92 |
| CaO | 6.29 |
| MgO | 1.19 |

The amount of water used was 17.9%.

The green nodules were fired at 2050° F. in an oxidizing atmosphere using the same apparatus as in Example II.

The sintered pellets were tested for water absorption characteristics following the procedure outlined above and the results are set forth in Table VI, below.

TABLE VI

| Time | Absorption, A | Absorption Ratio |
|---|---|---|
| 5 minutes | 13.4 | |
| 5 hours | 16.8 | 0.2052 |

The pellets had an apparent density of 55 lbs./ft.³.

*Example IV*

The following concrete mixes were prepared using the fly ash aggregates of Examples II and III.

From the 28 day strength data in Table VII, it can be seen that concrete compositions of this invention provide for greater strengths than that of nodulized fly ash aggregate sintered under the same conditions. In this connection comparison should be made between mixes A and B; C and D; and E and F which pairs represent respectively 5, 6 and 7 bag concrete mixes.

We claim:

1. A lightweight aggregate consisting essentially of discrete, finely divided siliceous particles bonded together at their points of contact by interfacial vitrification to form a substantially non-spherical solid body having interconnecting pores, an average transverse dimension of from about 1/8" to about 3/4" and a length of from about 1/4" to about 1", from about 80 percent to about 100 percent, by weight, of said particles comprising the highly siliceous, glassy spherical component of fly ash, and from about 0 to about 20 percent comprising a finely divided material selected from the group consisting of clay, shale, cinders and slag, said body being capable of absorbing from about 15 to about 30 percent, by weight, of water, on a dry basis, in 5 minutes, and only minor amounts of water subsequent thereto, whereby the ratio of water absorbed in an addiitonal 5 hours to the water absorbed in 5 minutes does not exceed about 0.03.

2. A light weight aggregate according to claim 1 having an apparent density of from about 35 to about 50 pounds per cubic foot.

3. A lightweight aggregate according to claim 1 consisting essentially of said fly ash component.

4. A method of making an improved lightweight aggregate which comprises preparing a moldable mixture comprising finely divided siliceous particles containing fuel needed for combustion during sintering and from about 10 to about 25 percent of water, based on total weight of said mixture, at least about 80 percent, by weight of said siliceous particles comprising the highly siliceous glassy spherical component of fly ash, molding said mixture into substantially non-spherical bodies having an average transverse dimension of from about 1/8" to about 3/4" and a length of from about 1/4" to about 1 1/2" under a low pressure sufficient for said bodies to be homogeneous, coherent and form-maintaining and having substantially the same water content as the mixture from which they are produced, and sintering said shaped bodies at a temperature between about 1800° and 2200° F. by combustion of said fuel in the presence of an amount of a combustion-sustaining gas which substantially prevents reduction of iron present in said particles to the ferrous state to bond together said siliceous particles at their points of contact by interfacial vitrification without inducing any substantially molten phase.

TABLE VII

| Constituent | Mix | | | | | |
|---|---|---|---|---|---|---|
| | $A_{II}$ | $B_{III}$ | $C_{II}$ | $D_{III}$ | $E_{II}$ | $F_{III}$ |
| Portland Cement (lbs.) | 546 | 546 | 658 | 658 | 752 | 752 |
| Lightweight Aggregate ¹ (lbs.) | 1,000 | 1,075 | 1,000 | 1,075 | 1,000 | 1,075 |
| Sand (lbs.) | 1,225 | 1,250 | 1,125 | 1,100 | 1,000 | 950 |
| Water (lbs.) | 390 | 399 | 403 | 406 | 448 | 463 |
| Slump (in.) ² | 4 | 4 | 4 | 4 | 4 | 4 |
| Air ³ | 5.8 | 4.5 | 6 | 5.0 | 4.9 | 4.0 |
| Wet Weight (lbs./ft.³) | 115.0 | 120.0 | 115.3 | 119.0 | 116.0 | 119.5 |
| Strength ⁴ 28 days (p.s.i.) | 5,448 | 5,160 | 5,858 | 5,240 | 6,080 | 5,390 |

¹ Wt. adjusted for same volume.
² A.S.T.M. designation: C143-58.
³ A.S.T.M. designation: C173-58.
⁴ A.S.T.M. designation: C39-64.
Mixes A, C and E contain aggregate of Example II.
Mixes B, D and F contain aggregate of Example III.

5. The method of claim 4, in which said fly ash component has the following chemical analysis:

| Constituent | Wt. percent |
| --- | --- |
| $Fe_2O_3$ | 5–35 |
| $SiO_2$ | 31–63 |
| $Al_2O_3$ | 10–40 |
| CaO | 0–12 |
| MgO | 0–6 | and said mix contains from about 2 to about 11 percent of carbon.

6. The method according to claim 4, in which said mixture consists essentially of water and said fly ash component.

7. A lightweight aggregate consisting essentially of discrete, finely divided siliceous particles bonded together at their points of contact by interfacial vitrification to form a substantially non-spherical solid body having interconnecting pores, an average transverse dimension of from about ⅛″ to about ¾″ and a length of from about ¼″ to about 1″, from about 80 percent to about 100 percent by weight, of said particles comprising the highly siliceous, glassy spherical component of fly ash, and from about 0 to about 20 percent comprising a finely divided material selected from the group consisting of clay, shale, cinders and slag, said body being capable of absorbing from about 15 to about 30 percent, by weight, of water, on a dry basis, in 5 minutes, and only minor amounts of water subsequent thereto.

8. A concrete mix consisting essentially of approximately 20 percent by weight of Portland cement, approximately 45 percent of sand, and approximately 35 percent of the lightweight aggregate of claim 7.

9. A concrete mix consisting essentially of approximately 20 percent by weight of Portland cement, approximately 45 percent of sand, and approximately 35 percent of the lightweight aggregate of claim 3.

References Cited
UNITED STATES PATENTS 2,987,411   6/1961   Minnick _____ 106—288

TOBIAS E. LEVOW, *Primary Examiner.*

JAMES E. POER, *Examiner.*

UNITED STATES PATENT OFFICE
CERTIFICATE OF CORRECTION

Patent No. 3,341,341                September 12, 1967

Bolton L. Corson et al.

It is hereby certified that error appears in the above numbered patent requiring correction and that the said Letters Patent should read as corrected below.

Column 4, line 69, for "9-6" read -- 0-6 --.

Signed and sealed this 1st day of October 1968.

(SEAL)
Attest:

Edward M. Fletcher, Jr.

Attesting Officer

EDWARD J. BRENNER

Commissioner of Patents